(12) United States Patent
Wu et al.

(10) Patent No.: US 11,132,432 B2
(45) Date of Patent: Sep. 28, 2021

(54) TACTILE CHALLENGE-RESPONSE TESTING FOR ELECTRONIC DEVICES

(71) Applicant: HEWLETT PACKARD ENTERPRISE DEVELOPMENT LP, Houston, TX (US)

(72) Inventors: Yu-Hsing Wu, Taipei (TW); YuYing Liang, Taipei (TW); Chang-Ta Huang, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 303 days.

(21) Appl. No.: 16/174,262

(22) Filed: Oct. 29, 2018

(65) Prior Publication Data

US 2020/0134157 A1 Apr. 30, 2020

(51) Int. Cl.
| | |
|---|---|
| *G06F 21/36* | (2013.01) |
| *G06F 3/0488* | (2013.01) |
| *G06F 3/16* | (2006.01) |
| *G06F 3/0482* | (2013.01) |
| *G06F 3/01* | (2006.01) |

(52) U.S. Cl.
CPC .............. *G06F 21/36* (2013.01); *G06F 3/016* (2013.01); *G06F 3/0482* (2013.01); *G06F 3/04883* (2013.01); *G06F 3/167* (2013.01)

(58) Field of Classification Search
CPC ...................................................... G06F 21/36
See application file for complete search history.

(56) References Cited

U.S. PATENT DOCUMENTS

| | | | |
|---|---|---|---|
| 8,307,407 B2 | 11/2012 | Jakobsson et al. | |
| 9,722,985 B2 | 8/2017 | Tartz | |
| 2011/0248837 A1 | 10/2011 | Israr | |
| 2012/0327006 A1* | 12/2012 | Israr ..................... | G06F 3/016 345/173 |

(Continued)

FOREIGN PATENT DOCUMENTS

WO    2017/181356 A1    10/2017

OTHER PUBLICATIONS

Kulwinder Kaur, "Haptic Alternatives for Mobile Device Authentication by Older Technology Users," Jul. 17, 2018, <https://www.researchgate.net/publication/326018311_Haptic_Alternatives_for_Mobile_Device_Authentication_by_Older_Technology_Users >.

*Primary Examiner* — Simon P Kanaan
(74) *Attorney, Agent, or Firm* — Hewlett Packard Einterprise Patent Department (57) ABSTRACT

Systems and methods described herein provide tactile challenge-response tests for limiting access to electronic resources associated with a computing system. When a user requests access an electronic resource, the system activates an alternating voltage in an electrode layer for a display associated with the system to generate an electrovibrational pattern on the display and prompting the user to perform a touch gesture upon the affected region of the display to allow the user to perceive the electrovibrational pattern via the user's sense of touch. Next, the computing system renders multiple different visual patterns on the display and prompts the user to select the visual pattern that matches the electrovibrational pattern. If the user correctly selects the visual pattern that matches the electrovibrational pattern, the system allows the user to access the electronic resource.

20 Claims, 5 Drawing Sheets

(56) References Cited

U.S. PATENT DOCUMENTS

2013/0311954 A1* 11/2013 Minkkinen ......... G06F 3/04883
 715/862
2014/0020087 A1 1/2014 Ooi
2017/0090569 A1 3/2017 Levesque

* cited by examiner

TACTILE CHALLENGE-RESPONSE TESTING FOR ELECTRONIC DEVICES

BACKGROUND

Challenge-response authentication refers to computer-security protocols in which one party presents a challenge (e.g., a question or an affirmative request for a specific action) and a responding party seeking to be authenticated must provide an acceptable response (e.g., a correct answer to a question) to be authenticated. For example, Completely Automated Public Turing tests to tell Computers and Humans Apart (CAPTCHAs) are challenge-response tests that is meant to tell humans and computers apart. Some CAPTCHAs present distorted images of text to a user and require the user to type the text into an input field. A human user can usually read the text in the distorted image with little difficulty, while a computer program (e.g., a bot) will often struggle to identify the text. Other CAPTCHAs present several images to a user and require the user to select the images that meet certain criteria. A human user can typically identify the proper images quickly, while a bot will typically struggle to identify the correct image.

Web sites often use CAPTCHAs to restrict access to certain services and resources to human users to prevent bots from overextending server resources. Restricting access in this fashion enables web sites to maintain desired service levels for human visitors. Malicious activities that employ bots, such as denial-of-service, such as purchasing mass quantities of limited goods (e.g., tickets to sporting events or concerts), can also be thwarted by CAPTCHAs.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

While existing challenge-response tests are effective for preventing some types of bots from accessing electronic resources, some advanced bots that can defeat existing challenge-response tests. In particular, as processing power and speed has increased, some types of CAPTCHAs (e.g., those with images of plain text) have become easier to defeat. Therefore, more complex challenge-response tests are needed to protect electronic resources from abuse and attacks from bots.

Systems of the present disclosure provide an electronic challenge-response system that can distinguish more advanced bots from human users. In systems of the present disclosure, the challenge-response test first uses an alternating electric current to generate a first electrovibrational pattern on a display and prompts the user to feel the pattern. The user can perceive the electrovibrational pattern via the user's sense of touch rather than the user's sense of vision. Next, the system presents a set of visual patterns (and/or electrovibrational patterns) to the user via the display and challenges the user to select the pattern that matches what the user perceived as the first electrovibrational pattern. Since existing bots lack a way to perceive the first electrovibrational pattern, the challenge-response system can distinguish human users from bots with a high degree of accuracy.

Figure 1:
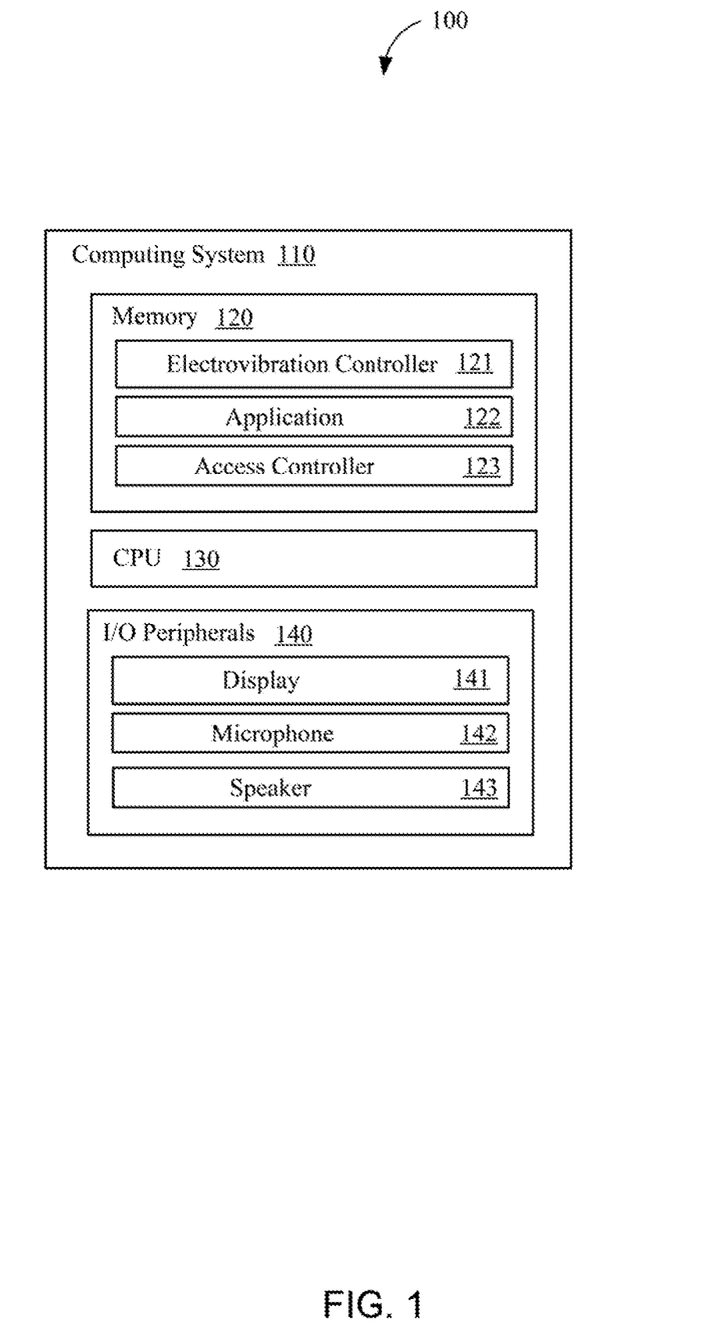
FIG. 1 illustrates a computing environment in which systems described herein can operate, according to one example.

FIG. 1 illustrates a computing environment 100 in which systems described herein can operate, according to one example. As shown, the computing environment 100 includes a computing system 110. The computing system 110 comprises memory 120, a central processing unit (CPU) 130, and input/output (I/O) peripherals 140. As shown, the I/O peripherals 140 may comprise a display 141 (e.g., a touch screen), a microphone 142, and a speaker 143.

The application 122 is stored in the memory 120 and is executed by the CPU 130. A user can interact with the application 122 via the I/O peripherals 140. For example, if the display 141 is a touch screen, the user may provide input for the application 122 through the display 141 or through the microphone 143. The application 122 may provide output for the user through the display 141 or through the speaker 143.

In different embodiments, the type and purpose of the application 122 may vary. For example, the application 122 may be a standalone application, a thin-client application, a video game, an office application (e.g., a word processor or a spreadsheet application), or some other type of application. However, regardless of the type and purpose of the application 122, the application 122 has the capacity to allow the user to use some type of electronic resource for which access is restricted (e.g., to human users only instead of bots). Again, the type of the electronic resource may vary in different embodiments. For example, the electronic resource may be a website, a database, file, a set of functions, an online service, a data repository, or some other type of resource.

When the user requests access to the electronic resource through the application 122 via the I/O peripherals 140, the application 122 signals the access controller 123 to perform a challenge-response test to determine whether to grant access to the electronic resource. The access controller 123 signals the electrovibration controller 121 to apply an alternating voltage to an electrode layer for the display 141 to generate an electrovibrational pattern in a region of the display 141. The electrovibrational pattern is tactile rather than visual such that the user cannot perceive the pattern simply by looking at the display 141. Rather, the user can perceive the pattern by touching the display 141 in the region where the electrovibration controller 121 applies the alternating voltage. In one example, the electrovibrational pattern is represented by a simulating a sensation of a texture that traces an arrangement one or more geometric features. Some example methods for creating the sensation of a texture on a display are described in greater detail in U.S.

Pat. No. 9,501,145, entitled "Electrovibration for Touch Surfaces," which is hereby incorporated by reference.

Once the electrovibrational pattern has been generated, the access controller 123 prompts the user (e.g., via the display 141 or the speaker 143) to perform a touch gesture upon the first region of the display 141 to allow the user to perceive the electrovibrational pattern. The touch gesture may be, for example, tapping or swiping the display 141 with one or more fingers on the region where the electrovibration controller 121 applies the alternating voltage.

When the access controller 123 detects that the user has completed performing the touch gesture, the access controller 123 proceeds to a second stage of the challenge-response test by rendering a plurality of different visual patterns on a plurality of corresponding regions the display 141. One of the visual patterns matches the electrovibrational pattern, but the other visual patterns do not match the electrovibrational pattern. Instead, the other visual patterns are provided as 'red herrings' to mislead bots.

The visual pattern that matches the electrovibrational pattern may, for example, trace an arrangement of one or more geometric features that the electrovibrational pattern traces using a texture. However, the visual pattern that matches the electrovibrational pattern traces the geometric features via the coloring of pixels on the display 141 instead of by a voltage gradient to create a texture. This allows the user to identify the matching visual pattern using a different sense (i.e., sight) than the sense (i.e., touch) that was used to perceive the electrovibrational pattern.

In some embodiments, for each respective visual pattern, the access controller 123 also signals the electrovibration controller 121 to activate an alternating voltage in the electrode layer beneath the corresponding region of the display 141 on which the respective visual pattern is rendered to generate a respective electrovibrational pattern that that matches the respective visual pattern. This allows users who are visually impaired to identify the matching pattern using touch rather than sight. Note that, in some embodiments, if the user is known to be visually impaired, the access controller 123 may forego rendering the visual patterns at all and simply elect to signal the electrovibration controller 121 to generate the respective vibrational patterns in the corresponding regions.

Once the visual patterns have been rendered (and/or, if applicable, the respective electrovibrational patterns have been generated), the access controller 123 prompts the user to identify which of the visual patterns matches the electrovibrational pattern. In response, the user selects one of the visual patterns. Upon receiving the user's selection, the access controller 123 determines whether the user has correctly identified the visual pattern that matches the electrovibrational pattern. If the user has successfully identified the matching visual pattern, the access controller 123 signals the application 122 to grant the user access to the electronic resource. Otherwise, the access controller 123 signals the application 122 to deny the user access to the electronic resource.

Figure 2:
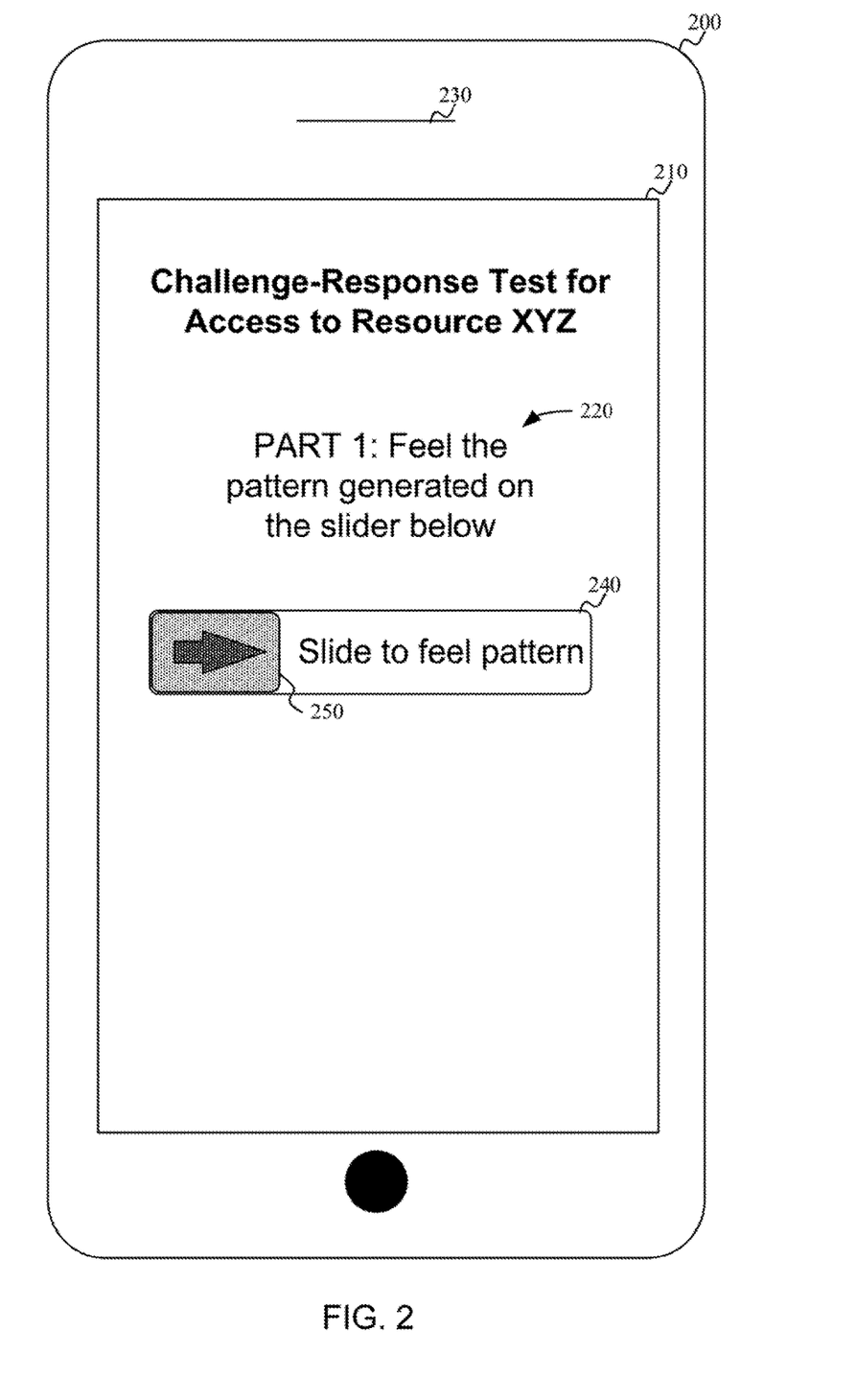
FIG. 2 illustrates an example of how a first part of a challenge-response test may appear when presented to a user on an example computing system, according to one embodiment.

FIG. 2 illustrates an example of how a first part of a challenge-response test may appear when presented to a user on an example computing system, according to one embodiment. In this example, a mobile device 200 is used as the example computing system. As shown, the mobile device 200 includes a touch screen 210.

When a user requests access to an electronic resource, the mobile device 200 displays a prompt 220 on the touch screen 210. If the user is visually impaired, the mobile device 200 may also recite an audio version of the prompt 220 via the speaker 230. The prompt 220 instructs the user feel an electrovibrational pattern generated in a region 240 of the touch screen 210. In response, the user can use a finger to slide the arrow icon 250 across the region 240 to perceive the electrovibrational pattern. Once the user finishes sliding the arrow icon 250 across the region 240, the mobile device 200 updates the content displayed on the touch screen 210 (e.g., as shown in FIG. 3 or FIG. 4).

Figure 3:
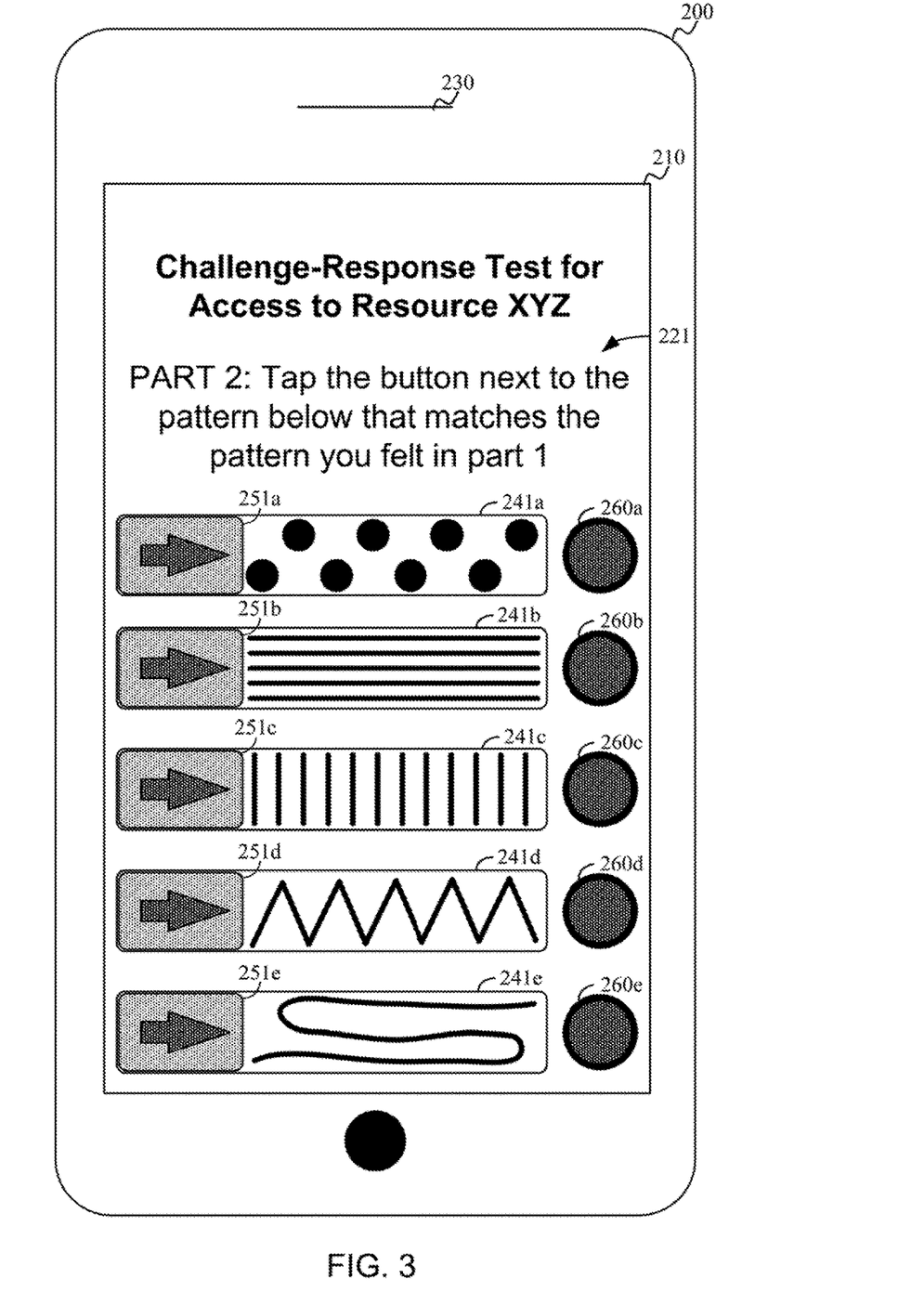
FIG. 3 illustrates a first example of how a second part of a challenge-response test may appear when presented to a user on an example computing system, according to one embodiment.
Figure 4:
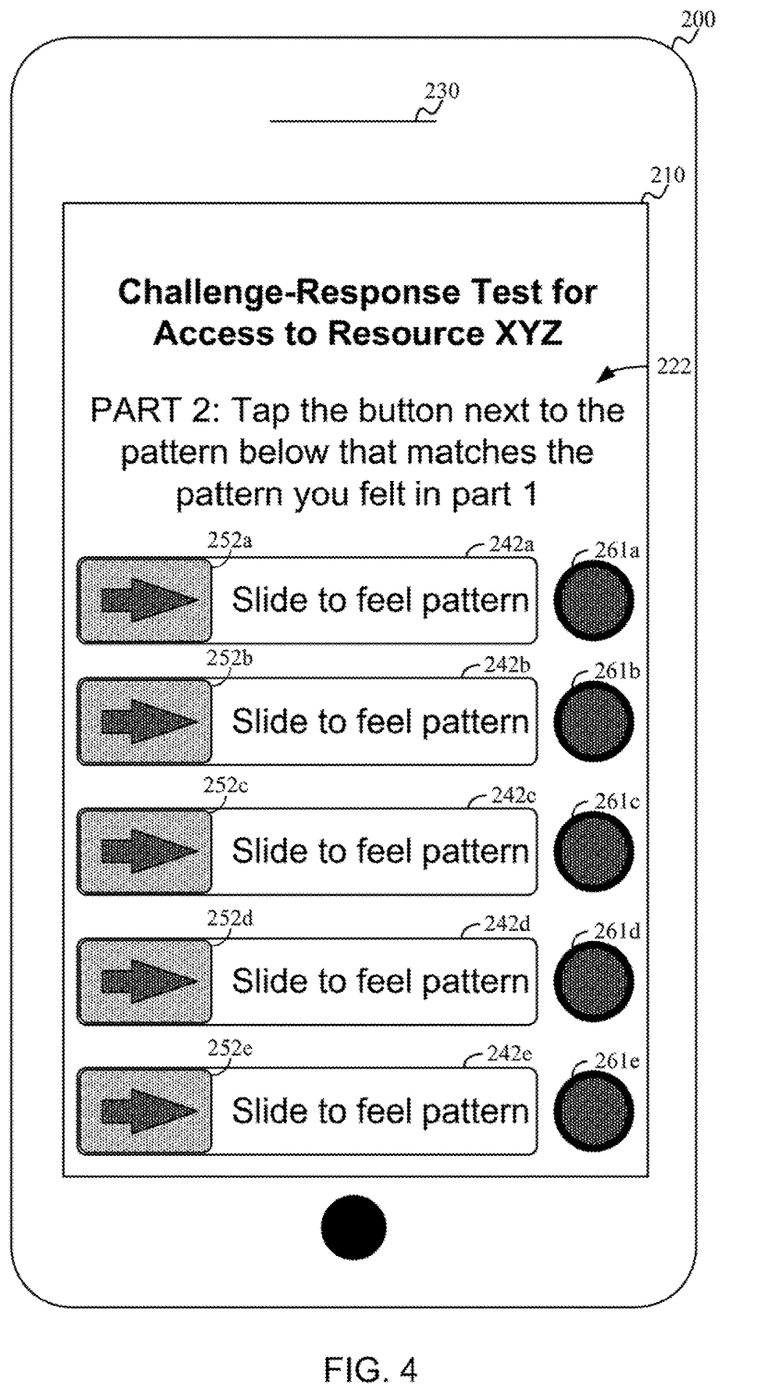
FIG. 4 illustrates a second example of how a second part of a challenge-response test may appear when presented to a user on an example computing system, according to one embodiment.

FIG. 3 illustrates a first example of how a second part of a challenge-response test may appear when presented to a user on an example computing system, according to one embodiment. Again, in this example, the mobile device 200 is used as the example computing system.

Once the mobile device 200 detects that the user has completed swiping the arrow icon 250 across the region 240 as shown in FIG. 2, the mobile device 200 displays visual patterns in regions 241a-241e, as shown. While many different types of patterns may be used without departing from the spirit and scope of this disclosure, several example visual patterns are provided. For example, an arrangement of dots is shown in region 241a, a set of parallel horizontal lines is shown in region 241b, a set of parallel vertical lines is shown in region 241c, a zigzag is shown in region 241d, and a free-form curve is shown in region 241e.

In some embodiments, the mobile device 200 also generates electrovibrational patterns in the regions 241a-e. The electrovibrational pattern generated in each region matches the visual pattern displayed in that region. For example, the electrovibrational pattern generated in region 241a will cause the user to feel a sensation of the arrangement of dots shown when the user slides the arrow icon 251a across the region 241a. One way to achieve this sensation is to generate a sensation of texture (e.g., via an alternating voltage) on the black dots shown in region 241a and to refrain from generating that sensation of texture in the background (the background is depicted as the white portions in the region 241a). Alternatively, a different texture can be generated on the background to create a tactile contrast between the dots and the background. Regardless of which approach is used, the user can feel the electrovibrational patterns generated in the regions 241a-e by sliding the arrow icons 251a-e across the regions 241a-e. Specifically, the user can slide arrow icon 251b across region 241b, arrow icon 251c across region 241c, arrow icon 251d across region 241d, and arrow icon 241e across region 241e.

The mobile device 200 also displays the prompt 221 on the touch screen 210. The prompt 221 instructs the user to select the visual pattern that matches the electrovibrational pattern the user felt when sliding the arrow icon 250 across the region 240 (as described with respect to FIG. 2). In response, the user can tap one of the buttons 260a-e to indicate which of the visual patterns the user believes to be a match. Specifically, if the user believes the arrangement of dots shown in region 241a to be the matching visual pattern, the user taps button 260a. Similarly, if the user believes the set of parallel horizontal lines shown in region 241b to be the matching visual pattern, the user taps button 260b. Similarly, the user can tap button 260c to select the set of parallel vertical lines shown in region 241c, button 260d to select the zigzag shown in region 241d, and button 260e to select the free-form curve shown in region 241e.

Once the user taps one of the buttons 260a-e, the mobile device 200 determines whether the user has correctly identified the visual pattern that matches the electrovibrational pattern that was generated in region 240 (shown in FIG. 1). If the user has successfully identified the matching visual pattern, the mobile device 200 grants the user access to the electronic resource. Otherwise, the mobile device 200 denies the user access to the electronic resource.

FIG. 4 illustrates a second example of how a second part of a challenge-response test may appear when presented to a user on an example computing system, according to one embodiment. In this example, the mobile device 200 is again used as the example computing system.

Once the mobile device 200 detects that the user has completed swiping the arrow icon 250 across the region 240 as shown in FIG. 2, the mobile device 200 does not display visual patterns in regions 241a-241e, as shown. Instead, the mobile device 200 generates electrovibrational patterns in the regions 242a-e without displaying the corresponding visual patterns. However, the electrovibrational pattern generated in each region, when touched, will still create a tactile sensation. For example, the electrovibrational pattern generated in region 242a can cause the user to feel a sensation of an arrangement of dots when the user slides the arrow icon 252a across the region 242a. The electrovibrational patterns generated in regions 242b-e may cause the user to feel sensations suggesting different geometric features, respectively. The user can feel the electrovibrational patterns generated in the regions 242a-e by sliding the arrow icons 252a-e across the regions 242a-e. Specifically, the user can slide arrow icon 252b across region 242b, arrow icon 252c across region 242c, arrow icon 252d across region 242d, and arrow icon 242e across region 242e.

The mobile device 200 also displays the prompt 222 on the touch screen 210. The prompt 222 instructs the user to select the electrovibrational pattern that matches the electrovibrational pattern the user felt when sliding the arrow icon 250 across the region 240 (as described with respect to FIG. 2). In response, the user can tap one of the buttons 261a-e to indicate which of the electrovibrational patterns the user believes to be a match. Specifically, if the user believes the arrangement of dots that can be perceived by swiping arrow icon 252a across region 242a to be the match, the user taps button 261a. Similarly, if the user believes a set of parallel horizontal lines that can be perceived by swiping arrow icon 252b across region 242b to be the match, the user taps button 261b. Similarly, the user can tap button 261c to select a set of parallel vertical lines that can be perceived by swiping arrow icon 252c across region 242c, button 261d to select a zigzag that can be perceived by swiping arrow icon 252d across region 242d, and button 261e to select a free-form curve that can be perceived by swiping arrow icon 252e across region 242e.

Once the user taps one of the buttons 261a-e, the mobile device 200 determines whether the user has correctly identified the matching electrovibrational pattern. If the user has successfully identified the matching electrovibrational pattern, the mobile device 200 grants the user access to the electronic resource. Otherwise, the mobile device 200 denies the user access to the electronic resource.

Figure 5:
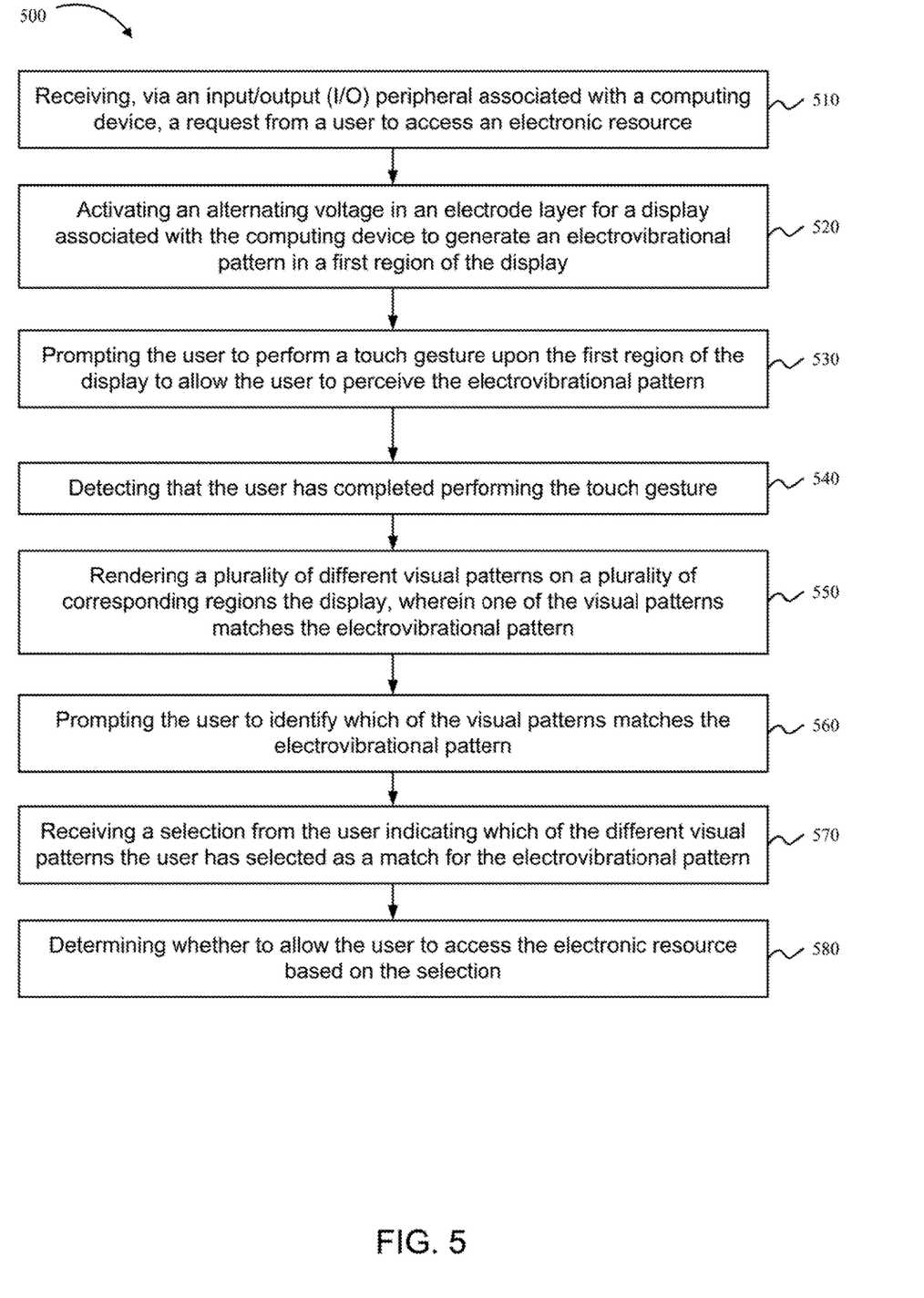
FIG. 5 illustrates functionality for an AP as described herein, according to one example.

FIG. 5 illustrates functionality 500 for an AP as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only eight blocks are shown in the functionality 500, the functionality 500 may include other actions described herein. Also, some of the blocks shown in the functionality 500 may be omitted without departing from the spirit and scope of this disclosure.

As shown in block 510, the functionality 500 includes receiving, via an input/output (I/O) peripheral associated with a computing device, a request from a user to access an electronic resource. The I/O peripheral through which the request is received may be, for example, a keyboard, a display (e.g., a touch screen), a mouse device, a pen input, a microphones, a motion sensors, or some other type of I/O peripheral.

As shown in block 520, the functionality 500 includes activating an alternating voltage in an electrode layer for a display associated with the computing device to generate an electrovibrational pattern in a first region of the display. In one example, the display comprises an insulating layer positioned between the electrode layer and a surface of the display upon which the user performs the touch gesture.

As shown in block 530, the functionality 500 includes prompting the user to perform a touch gesture upon the first region of the display to allow the user to perceive the electrovibrational pattern. Prompting the user to perform the touch gesture may comprise, for example, providing initial audio instructions to the user via a speaker or showing instructions on the display.

As shown in block 540, the functionality 500 includes detecting that the user has completed performing the touch gesture.

As shown in block 550, the functionality 500 includes rendering a plurality of different visual patterns on a plurality of corresponding regions the display, wherein one of the visual patterns matches the electrovibrational pattern. In one example, the functionality 500 also includes, for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture. The visual patterns may comprise, for example, one or more of: a zig zag, a plurality of parallel horizontal lines, a plurality of parallel vertical lines, or a plurality of dots.

As shown in block 560, the functionality 500 includes prompting the user to identify which of the visual patterns matches the electrovibrational pattern. Prompting the user to identify which of the visual patterns matches the electrovibrational pattern may comprise, for example, providing audio instructions to the user via a speaker or showing instructions on the display.

As shown in block 570, the functionality 500 includes receiving a selection from the user indicating which of the different visual patterns the user has selected as a match for the electrovibrational pattern.

As shown in block 580, the functionality 500 includes determining whether to allow the user to access the electronic resource based on the selection. Specifically, in one example, the functionality 500 includes detecting that the selection correctly identifies the visual pattern that matches the electrovibrational pattern and allowing the user to access the electronic resource via the computing device. In another example, the functionality 500 includes detecting that the selection does not correctly identify the visual pattern that matches the electrovibrational pattern and preventing the user from accessing the electronic resource via the computing device.

EXAMPLES

The following additional examples are included below to highlight several aspects of the apparatus and processes described herein. However, the scope of the disclosure is not limited to these additional examples or the other examples described herein.

Example 1 includes a system comprising: one or more processors; and a memory storing instructions that, when executed on the one or more processors, perform a set of actions, the set of actions comprising: receiving, via an input/output (I/O) peripheral associated with a computing device, a request from a user to access an electronic resource; activating an alternating voltage in an electrode layer for a display associated with the computing device to generate an electrovibrational pattern in a first region of the display; prompting the user to perform a touch gesture upon the first region of the display to allow the user to perceive the electrovibrational pattern; detecting that the user has completed performing the touch gesture; rendering a plurality of different visual patterns on a plurality of corresponding regions the display, wherein one of the visual patterns matches the electrovibrational pattern; prompting the user to identify which of the visual patterns matches the electrovibrational pattern; receiving a selection from the user indicating which of the different visual patterns the user has selected as a match for the electrovibrational pattern; and determining whether to allow the user to access the electronic resource based on the selection.

Example 2 includes the system of example 1, wherein the set of actions further comprises: detecting that the selection correctly identifies the visual pattern that matches the electrovibrational pattern; and allowing the user to access the electronic resource via the computing device.

Example 3 includes the system of example 1, wherein the set of actions further comprises: detecting that the selection does not correctly identify the visual pattern that matches the electrovibrational pattern; and preventing the user from accessing the electronic resource via the computing device.

Example 4 includes the system of example 1, 2, or 3, wherein the display comprises an insulating layer positioned between the electrode layer and a surface of the display upon which the user performs the touch gesture.

Example 5 includes the system of example 1, 2, 3, or 4, wherein the set of actions further comprises: for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture.

Example 6 includes the system of example 1, 2, 3, 4, or 5, wherein: the request from the user is received via a microphone; prompting the user to perform the touch gesture comprises providing initial audio instructions to the user via a speaker; and prompting the user to identify which of the visual patterns matches the electrovibrational pattern comprises providing additional audio instructions to the user via the speaker.

Example 7 includes system of example 1, 2, 3, 4, 5, or 6, wherein the visual patterns comprise one or more of: a zig zag, a plurality of parallel horizontal lines, a plurality of parallel vertical lines, or a plurality of dots.

Example 8 includes a method comprising: receiving, via an input/output (I/O) peripheral associated with a computing device, a request from a user to access an electronic resource; activating an alternating voltage in an electrode layer for a display associated with the computing device to generate an electrovibrational pattern in a first region of the display; prompting the user to perform a touch gesture upon the first region of the display to allow the user to perceive the electrovibrational pattern; detecting that the user has completed performing the touch gesture; rendering a plurality of different visual patterns on a plurality of corresponding regions the display, wherein one of the visual patterns matches the electrovibrational pattern; prompting the user to identify which of the visual patterns matches the electrovibrational pattern; receiving a selection from the user indicating which of the different visual patterns the user has selected as a match for the electrovibrational pattern; and determining whether to allow the user to access the electronic resource based on the selection.

Example 9 includes the method of example 8, further comprising: detecting that the selection correctly identifies the visual pattern that matches the electrovibrational pattern; and allowing the user to access the electronic resource via the computing device.

Example 10 includes the method of example 8, further comprising: detecting that the selection does not correctly identify the visual pattern that matches the electrovibrational pattern; and preventing the user from accessing the electronic resource via the computing device.

Example 11 includes the method of example 8, 9, or 10, wherein the display comprises an insulating layer positioned between the electrode layer and a surface of the display upon which the user performs the touch gesture.

Example 12 includes the method of example 8, 9, 10, or 11, further comprising: for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture.

Example 13 includes the method of example 8, 9, 10, 11, or 12, wherein: the request from the user is received via a microphone; prompting the user to perform the touch gesture comprises providing initial audio instructions to the user via a speaker; and prompting the user to identify which of the visual patterns matches the electrovibrational pattern comprises providing additional audio instructions to the user via the speaker.

Example 14 includes the method of example 8, 9, 10, 11, 12, or 13, wherein the visual patterns comprise one or more of: a zig zag, a plurality of parallel horizontal lines, a plurality of parallel vertical lines, or a plurality of dots.

Example 15 includes a non-transitory computer-readable storage medium containing instructions thereon that, when executed on a processor, perform a set of actions comprising: receiving, via an input/output (I/O) peripheral associated with a computing device, a request from a user to access an electronic resource; activating an alternating voltage in an electrode layer for a display associated with the computing device to generate an electrovibrational pattern in a first region of the display; prompting the user to perform a touch gesture upon the first region of the display to allow the user to perceive the electrovibrational pattern; detecting that the user has completed performing the touch gesture; rendering a plurality of different visual patterns on a plurality of corresponding regions the display, wherein one of the visual patterns matches the electrovibrational pattern; prompting the user to identify which of the visual patterns matches the electrovibrational pattern; receiving a selection from the user indicating which of the different visual patterns the user has selected as a match for the electrovibrational pattern; and determining whether to allow the user to access the electronic resource based on the selection.

Example 16 includes the non-transitory computer-readable storage medium of example 15, wherein the set of actions further comprises: detecting that the selection correctly identifies the visual pattern that matches the electrovibrational pattern; and allowing the user to access the electronic resource via the computing device.

Example 17 includes the non-transitory computer-readable storage medium of example 15, wherein the set of actions further comprises: detecting that the selection does not correctly identify the visual pattern that matches the electrovibrational pattern; and preventing the user from accessing the electronic resource via the computing device.

Example 18 includes the non-transitory computer-readable storage medium of example 15, 16, or 17, wherein the display comprises an insulating layer positioned between the electrode layer and a surface of the display upon which the user performs the touch gesture.

Example 19 includes the non-transitory computer-readable storage medium of example 15, 16, 17, or 18, wherein the set of actions further comprises: for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture.

Example 20 includes the non-transitory computer-readable storage medium of example 15, 16, 17, 18, or 19, wherein: the request from the user is received via a microphone; prompting the user to perform the touch gesture comprises providing initial audio instructions to the user via a speaker; and prompting the user to identify which of the visual patterns matches the electrovibrational pattern comprises providing additional audio instructions to the user via the speaker.

Example 21 includes the non-transitory computer-readable storage medium of example 15, 16, 17, 18, 19, or 20, wherein the visual patterns comprise one or more of: a zig zag, a plurality of parallel horizontal lines, a plurality of parallel vertical lines, or a plurality of dots.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

Examples are presented herein for purposes of illustration, but examples of the present disclosure are not intended to be limited to any of the disclosed examples. Many modifications and variations will be apparent to those of ordinary skill in the art without departing from the scope and spirit of the described embodiments. The terminology used herein was chosen to explain the principles of the examples, the practical application or technical improvement over technologies found in the marketplace, or to enable others of ordinary skill in the art to understand the examples disclosed herein.

Furthermore, although examples described herein may achieve advantages over other possible solutions or over existing art, whether or not a particular advantage is achieved by a given example is not limiting of the scope of the present disclosure. Thus, the examples and advantages described are merely illustrative and are not considered elements or limitations of the appended claims except where explicitly recited in the claims.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples of computer-readable storage mediums include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
   one or more processors; and
   a memory storing instructions that, when executed on the one or more processors, perform a set of actions, the set of actions comprising:
   receiving, via an input/output (I/O) peripheral associated with a computing device, a request from a user to access an electronic resource;
   activating an alternating voltage in an electrode layer for a display associated with the computing device to generate an electrovibrational pattern in a first region of the display;
   prompting the user to perform a touch gesture upon the first region of the display to allow the user to perceive the electrovibrational pattern;
   detecting that the user has completed performing the touch gesture;
   rendering a plurality of different visual patterns on a plurality of corresponding regions the display, wherein one of the visual patterns matches the electrovibrational pattern;
   prompting the user to identify which of the visual patterns matches the electrovibrational pattern;
   receiving a selection from the user indicating which of the different visual patterns the user has selected as a match for the electrovibrational pattern; and
   determining whether to allow the user to access the electronic resource based on the selection.

2. The system of claim 1, wherein the set of actions further comprises:
   detecting that the selection correctly identifies the visual pattern that matches the electrovibrational pattern; and allowing the user to access the electronic resource via the computing device.

3. The system of claim 1, wherein the set of actions further comprises:
    detecting that the selection does not correctly identify the visual pattern that matches the electrovibrational pattern; and
    preventing the user from accessing the electronic resource via the computing device.

4. The system of claim 1, wherein the display comprises an insulating layer positioned between the electrode layer and a surface of the display upon which the user performs the touch gesture.

5. The system of claim 1, wherein the set of actions further comprises:
    for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture.

6. The system of claim 1, wherein:
    the request from the user is received via a microphone;
    prompting the user to perform the touch gesture comprises providing initial audio instructions to the user via a speaker; and
    prompting the user to identify which of the visual patterns matches the electrovibrational pattern comprises providing additional audio instructions to the user via the speaker.

7. The system of claim 1, wherein the visual patterns comprise one or more of: a zig zag, a plurality of parallel horizontal lines, a plurality of parallel vertical lines, or a plurality of dots.

8. A method comprising:
    receiving, via an input/output (I/O) peripheral associated with a computing device, a request from a user to access an electronic resource;
    activating an alternating voltage in an electrode layer for a display associated with the computing device to generate an electrovibrational pattern in a first region of the display;
    prompting the user to perform a touch gesture upon the first region of the display to allow the user to perceive the electrovibrational pattern;
    detecting that the user has completed performing the touch gesture;
    rendering a plurality of different visual patterns on a plurality of corresponding regions the display, wherein one of the visual patterns matches the electrovibrational pattern;
    prompting the user to identify which of the visual patterns matches the electrovibrational pattern;
    receiving a selection from the user indicating which of the different visual patterns the user has selected as a match for the electrovibrational pattern; and
    determining whether to allow the user to access the electronic resource based on the selection.

9. The method of claim 8, further comprising:
    detecting that the selection correctly identifies the visual pattern that matches the electrovibrational pattern; and
    allowing the user to access the electronic resource via the computing device.

10. The method of claim 8, further comprising:
    detecting that the selection does not correctly identify the visual pattern that matches the electrovibrational pattern; and
    preventing the user from accessing the electronic resource via the computing device.

11. The method of claim 8, wherein the display comprises an insulating layer positioned between the electrode layer and a surface of the display upon which the user performs the touch gesture.

12. The method of claim 8, further comprising:
    for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture.

13. The method of claim 8, wherein:
    the request from the user is received via a microphone;
    prompting the user to perform the touch gesture comprises providing initial audio instructions to the user via a speaker; and
    prompting the user to identify which of the visual patterns matches the electrovibrational pattern comprises providing additional audio instructions to the user via the speaker.

14. The method of claim 8, wherein the visual patterns comprise one or more of: a zig zag, a plurality of parallel horizontal lines, a plurality of parallel vertical lines, or a plurality of dots.

15. A non-transitory computer-readable storage medium containing instructions thereon that, when executed on a processor, perform a set of actions comprising:
    receiving, via an input/output (I/O) peripheral associated with a computing device, a request from a user to access an electronic resource;
    activating an alternating voltage in an electrode layer for a display associated with the computing device to generate an electrovibrational pattern in a first region of the display;
    prompting the user to perform a touch gesture upon the first region of the display to allow the user to perceive the electrovibrational pattern;
    detecting that the user has completed performing the touch gesture;
    rendering a plurality of different visual patterns on a plurality of corresponding regions the display, wherein one of the visual patterns matches the electrovibrational pattern;
    prompting the user to identify which of the visual patterns matches the electrovibrational pattern;
    receiving a selection from the user indicating which of the different visual patterns the user has selected as a match for the electrovibrational pattern; and
    determining whether to allow the user to access the electronic resource based on the selection.

16. The non-transitory computer-readable storage medium of claim 15, wherein the set of actions further comprises:
    detecting that the selection correctly identifies the visual pattern that matches the electrovibrational pattern; and
    allowing the user to access the electronic resource via the computing device.

17. The non-transitory computer-readable storage medium of claim 15, wherein the set of actions further comprises:
    detecting that the selection does not correctly identify the visual pattern that matches the electrovibrational pattern; and
    preventing the user from accessing the electronic resource via the computing device.

18. The non-transitory computer-readable storage medium of claim 15, wherein the display comprises an insulating layer positioned between the electrode layer and a surface of the display upon which the user performs the touch gesture.

19. The non-transitory computer-readable storage medium of claim 15, wherein the set of actions further comprises:
for each visual pattern, activating an alternating voltage in the electrode layer beneath the corresponding region of the display on which the visual pattern is rendered to generate a corresponding electrovibrational pattern that that matches the visual pattern to create a sensation of a texture on the visual pattern when the user performs the touch gesture.

20. The non-transitory computer-readable storage medium of claim 1, wherein:
the request from the user is received via a microphone;
prompting the user to perform the touch gesture comprises providing initial audio instructions to the user via a speaker; and
prompting the user to identify which of the visual patterns matches the electrovibrational pattern comprises providing additional audio instructions to the user via the speaker.

* * * * *